(12) United States Patent
Sridharan et al.

(10) Patent No.: US 8,190,698 B2
(45) Date of Patent: May 29, 2012

(54) EFFICIENTLY POLLING TO DETERMINE COMPLETION OF A DMA COPY OPERATION

(75) Inventors: Murari Sridharan, Sammamish, WA (US); Sanjay N. Kaniyar, Redmond, WA (US); Alireza Dabagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/479,907

(22) Filed: Jun. 30, 2006

(65) Prior Publication Data

US 2008/0005258 A1  Jan. 3, 2008

(51) Int. Cl.
*G06F 15/167* (2006.01)
*G06F 13/28* (2006.01)

(52) U.S. Cl. ............... 709/212; 709/250; 710/22
(58) Field of Classification Search ............... 710/22; 709/250, 212
See application file for complete search history.

(56) References Cited

U.S. PATENT DOCUMENTS

| | | | |
|---|---|---|---|
| 5,280,477 A | 1/1994 | Trapp | |
| 5,448,558 A | 9/1995 | Gildea et al. | |
| 5,533,203 A * | 7/1996 | Fischer et al. | 710/52 |
| 5,754,884 A | 5/1998 | Swanstrom | |
| 6,034,963 A | 3/2000 | Minami et al. | |
| 6,092,115 A | 7/2000 | Choudhury et al. | |
| 6,173,333 B1 | 1/2001 | Jolitz et al. | |
| 6,252,851 B1 | 6/2001 | Sim et al. | |
| 6,965,941 B2 | 11/2005 | Boucher et al. | |
| 2002/0095519 A1 | 7/2002 | Philbrick et al. | |
| 2002/0184287 A1 | 12/2002 | Nunally | |
| 2003/0093573 A1 | 5/2003 | Gambino | |
| 2004/0073721 A1 * | 4/2004 | Goff et al. | 710/22 |
| 2004/0088704 A1 * | 5/2004 | Owen et al. | 718/100 |
| 2004/0146054 A1 | 7/2004 | Golshan et al. | |
| 2005/0050480 A1 | 3/2005 | Katla et al. | |
| 2005/0122986 A1 | 6/2005 | Starr et al. | |

(Continued)

FOREIGN PATENT DOCUMENTS

KR  20050011191 A  1/2005

OTHER PUBLICATIONS

International Search Report from corresponding International Application No. PCT/US2007/011633, filed May 14, 2007.

(Continued)

*Primary Examiner* — Kevin Bates
*Assistant Examiner* — Mohammed Ahmed
(74) *Attorney, Agent, or Firm* — Wolf, Greenfield & Sacks, P.C.

(57) ABSTRACT

Efficiently polling a DMA module to determine if the DMA copying of a packet payload to an application buffer is complete. For communication packets received from a network, a processing module may be configured to poll the DMA module at times when it is likely that the DMA copying of packet payloads is complete. Packets may be received and processed in batches. The polling of the DMA module for a packet belonging to a first batch may be deferred until the processing of a next batch. An exception may occur if a predefined amount of time elapses following the completion of the processing of the first batch before the next batch is received. In response to the predefined amount of time elapsing before the receipt of the next batch, the DMA module may be polled, i.e., prior to the next batch being processed.

18 Claims, 4 Drawing Sheets

U.S. PATENT DOCUMENTS

| | | |
|---|---|---|
| 2005/0226238 A1 | 10/2005 | Hoskote et al. |
| 2006/0149862 A1* | 7/2006 | Zaabab et al. ............... 710/22 |
| 2008/0005258 A1* | 1/2008 | Sridharan et al. ............ 709/212 |

OTHER PUBLICATIONS

Goyal, R. et al.. "Buffer management and rate guarantees for TCP over satellite-ATM networks," Wiley InterScience, http://www3.interscience.wiley.com/cgi-bin/abstract/77003011/ABSTRACT.

Aweya, J. et al.. "Explicit TCP window adaptation in a shared memory architecture," Wiley InterScience, http://www3.interscience.wiley.com/cgi-bin/abstract/104524134/ABSTRACT.

Regnier, G., et al., "TCP Onloading for data center servers," IEEE Computer Society, 2004, pp. 48-58; http://ieeexplore.ieee.org/iel5/2/29851/01362588.pdf?isNumber=.

Matsuda, M., et al., "The Design and Implementation of an Asynchronous Communication Mechanism for the MPI Communication M," Cluster 2004 Abstract, http://grail.sdsc.edu/cluster2004/Abstracts/abstract_83.html.

* cited by examiner

EFFICIENTLY POLLING TO DETERMINE COMPLETION OF A DMA COPY OPERATION

BACKGROUND

In recent years, as a result of the introduction of faster (e.g., multi-gigabit) network adapters, there has been a tremendous increase in available network bandwidth. Unfortunately, there has not been a comparable increase in the processing power of central processing unites (CPUs) to take advantage of the available bandwidth. In particular, the processing of received packets is still a CPU-intensive task and a common bottleneck in network input/output (I/O). Many technologies have been developed to alleviate this problem, including: "checksum task offload," which delegates the calculating and verifying of Internet Protocol (IP) and Transmission Control Protocol (TCP) checksum to the Network Interface Card (NIC) hardware; "TCP Chimney offload," which offloads the handling of the entire TCP connection to the hardware; "Remote DMA" (RDMA), which makes it possible for a NIC to employ direct memory access (DMA) techniques to send incoming packets directly to the application buffer (without CPU assistance); and "Receive Side Scaling" (RSS), which distributes the processing of receive packets across multiple processors.

One of the most CPU-intensive tasks during receive processing (i.e., the processing of packets received from a network) is copying an incoming packet from a NIC receive buffer to an application buffer. This copy results from the following process. At the time of receiving a network packet, NIC hardware does not know the final destination of the packet payload. Therefore, the hardware copies the packet to a temporary buffer (i.e., a NIC receive buffer). After TCP/IP processing of the packet identifies the application buffer (I/O request buffer) to which the packet payload should be copied, the CPU is utilized to copy the payload to the application buffer. A DMA engine can be used to perform this copy without CPU intervention, which frees up CPU processing power to perform other tasks, such as processing other incoming packets. Using the freed-up CPU processing time to process other incoming packets allows incoming packets to be processed at a faster rate overall, thereby improving the throughput of the network from which the packets are received.

DMA engines that can perform memory-to-memory DMA are now available on chips made by Intel Corp., and it is expected that DMA engines having this capability will become available from other vendors as well. Because the purpose of using a DMA engine is to free a CPU for other purposes, an interface with the DMA engine (i.e., a DMA interface) must support submitting a DMA copy request to the DMA engine on behalf of a processing entity (e.g., a TCP/IP stack) and returning control to the processing entity immediately without waiting for the copy operation to finish. This requirement implies that the copy operation performed by the DMA engine must be "asynchronous." That is, the copy happens concurrently to the CPU performing other tasks. For such asynchronous copying, a mechanism must be in place to discover when the copy operation is completed.

There are two common methods for handling completion of an asynchronous operation: polling; and interrupt. In the "polling" method, the component that is performing the asynchronous operation (e.g., a DMA engine) updates a register (e.g., completion status register) when the operation is completed. In this scheme, to positively confirm the completion of the asynchronous operation, the requesting entity or requester (e.g., the entity processing a packet) continuously polls the value of the completion register (e.g., by reading it) until the state of the register indicates that the operation is complete.

In the "interrupt" method, the component that performs the asynchronous operation (e.g., a DMA engine) interrupts the CPU when the operation (e.g., a DMA copy) is complete. A DMA engine driver typically handles the interrupt for an asynchronous DMA copy operation. Typically, when a DMA copy is complete, the DMA engine driver calls a pre-registered function in the requesting entity to notify the entity that the requested copy operation is complete.

There are advantages and disadvantages to both the polling method and the interrupt method. The polling method can be very inefficient if the polling is performed too early, but very cheap if the requester polls only when the operation is most likely completed. The interrupt method is generally expensive as it needs a lot of processing by a host CPU, but it can be useful in situations where checking for completion happens infrequently. Both completion models can be used with a DMA engine.

As mentioned above, the cost of a polling method depends heavily on the timing of the poll operation. For an entity (e.g., a layer of a TCP/IP stack) that employs TCP processing to use a DMA engine efficiently, the entity must overlap the TCP processing that it performs (e.g., analyzing the received packet, finding the active connection to which the packet belongs, acknowledging the received packet to the sender, etc.) with the performance of the DMA copy by the DMA engine, and poll for completion at an appropriate time.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems, methods and software for efficiently polling a DMA module to determine if the DMA copying of a packet payload to an application buffer is complete. For communication packets received from a network, a processing module may be configured to poll the DMA module at times when it is likely that the DMA copying of packet payloads is complete. Packets may be received and processed in batches. The polling of the DMA module for a packet belonging to a first batch may be deferred until the processing of a next batch. An exception may occur if a predefined-amount of time elapses following the completion of the processing of the first batch before the next batch is, received. The DMA module may be polled in response to the predefined amount of time elapsing before the receipt of the next batch, i.e., prior to the next batch being processed.

For example, communication packets may be received at a network interface module (e.g., a NIC) and communicated in batches to a network communications processing module (e.g., a TCP/IP stack) of a host. The processing module may process each packet in the batch, including determining the connection and application corresponding to each packet and determining the application buffer to which the payload of the packet should be copied. For each packet in the batch, the processing module may send a DMA request to a DMA module (e.g., through a DMA interface to a DMA engine) requesting that the packet be DMA copied from a buffer of the network interface module to the application buffer.

At the completion of the processing of the batch, the processing module may set a timer. If the timer expires before a next batch is received, in response, the processing module may poll the DMA module, for each packet, to ascertain whether the DMA copying of the payload of the packet is complete. If a next batch is received before the timer expires, the processing module may poll the DMA module during the processing of the next batch.

The processing of a packet corresponding to an application may be part of processing an I/O request for the application as a result of receiving the packet from another network device (i.e., the sender). The processing module may not complete the I/O request until the DMA copying of the packet payload is complete. Accordingly, if the response to the polling indicates that the DMA copying is complete, the processing module may complete the I/O request by indicating completion to the corresponding application and my send an acknowledgment of such completion to the sender of the packet. If the response indicates that the DMA copying is not complete, the processing module may poll again, in accordance with with a preconfigured timing and frequency.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Although embodiments of the invention are described below primarily in relation to DMA copying for a network receive operation from a NIM buffer to an application buffer, the invention is not so limited. Aspects of the invention may be implemented for other DMA operations that do not involve network receive operations, NIM buffers and/or application buffers.

The function and advantage of the above embodiments and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising," "including," "carrying" "having," "containing," "involving," and the like are to be understood to be open-ended, i.e., to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
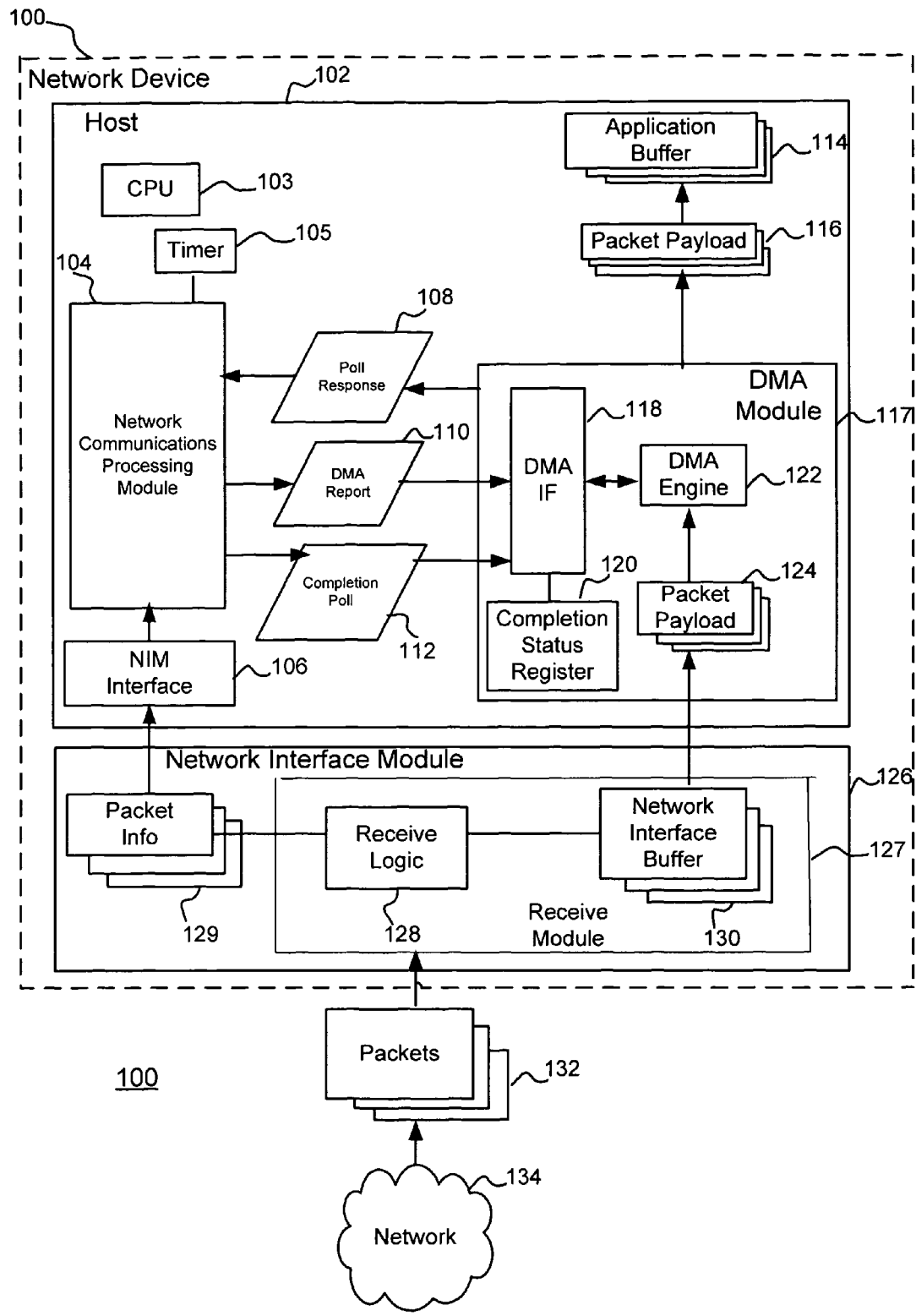
FIG. 1 is a block diagram illustrating an example of a system for efficiently polling a DMA module to determine completion of a DMA copy operation, according to some embodiments of the invention.

FIG. 1 is a block diagram illustrating an example of a system 100 for efficiently polling a DMA module to determine completion of a DMA copy operation, according to some embodiments of the invention. System 100 is merely an illustrative embodiment of a system for efficiently polling a DMA module to determine completion of a DMA copy operation, and is not intended to limit the scope of the invention. Any of numerous other implementations of such a system, for example, variations of system 100, are possible and are intended to fall within the scope of the invention.

As used herein, a "DMA module" is a module configured to perform DMA copy operations. A "DMA copy" is the copying of information from one storage location (e.g., memory, disk, or other location) to another location on a computer (e.g., a network device) without the use of a CPU. A "CPU" may be or comprise any of a variety of types of CPU, such as, for example, a processor, microprocessor, an embedded processor, a controller, a microcontroller, other types of CPUs, or any suitable combination of the foregoing. Although only a single CPU 103 is illustrated in FIG. 1, it should be appreciated that the invention is not so limited, as system 100 may include multiple CPUs, for example, configured for parallel processing. For example, system 100 may be configured to employ any of a variety of technologies designed for use of multiple CPUs such as, for example, "Receive Side Scaling" (RSS).

System 100 may include any of: network communications processing module 104; CPU 103; timer 105; application buffer 114; DMA module 117; network interface module (NIM) 126; NIM interface 106; network 134; other components; and any suitable combination of the foregoing. As illustrated in FIG. 1, components 104, 106, 114 and 117 may be implemented as part of a host 102, which along with NIM 126 may be part of a network device 101 connected to and/or part of network 134. For example, NIM 126 may be a network interface card (NIC), which along with one or more NIMs (e.g., NICs) may be interfaced to host 102. Further, any of elements 104, 106 and 117 or components thereof may be implemented as part of an operating system of host 102, which may be of any of a variety of types, such as, for example, any of the operating systems available from Microsoft Corporation listed below.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network (e.g., network 134) is illustrated in a drawing of this application as being connected to an element in the drawing (e.g., network device 101), the connected element itself may be considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile), pagers, Blackberry™ brand devices, PCS devices, personal digital assistants (PDAs), Smartphones, two-way radios (e.g., "walkie-talkies"), other types of user devices, and any suitable combination of the foregoing.

A network (e.g., network 134) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

Packets 132 may be received at NIM 126 from network 134, for example, from another network device in accordance with one or more network communications protocols. NIM may be any of a variety of types of known NIMs (e.g., NICs available from a variety of manufacturers). NIM 126 may include a receive module 127 specifically configured to handle packets received from network 134. Receive module 127 may include receive logic 128 for handling packets 132 and one or more network interface buffers (e.g., NIC buffers) 130 for storing packet information of packets 132 such as, for example, entire packets and/or packet payloads. As used herein, the "payload" of a packet is the contents of a packet to be sent to an application buffer. These contents typically comprise the information in the packet configured for consumption by an application and typically do not include header information configured for consumption by lower network protocol layers such as, for example, data link layers (including Media Access Control (MAC) layers and logical link layers), network (e.g., IP) layers and transport (e.g., TCP) layers.

In response to receiving packets 132, receive logic 128 may send an initial interrupt to host 102 to indicate the packets have been received, which may be referred to herein as a "receive interrupt". While it waits to receive a response to the receive interrupt (e.g., a DPC as described below in relation to FIG. 3), receive logic 128 may be configured to analyze header information and/or other information within packets 132, and some cases may be configured to perform one or more operations commonly associated with a network communications stack (e.g., a TCP/IP stack), as described, in more detail below. Receive logic 128 may be configured to coordinate the transfer of packets 132 from NIM 126 to host 102 based on the analyzed header information and/or other information and may be configured to send packet information 129 to host 102, for example, after receiving a response to the receive interrupt from the host. The packet information for each packet may include the entire packet or pieces of information corresponding to each packet such as, for example, header information corresponding to one or more layers of a network communications protocol.

NIM interface 106 may be configured to receive packet information 129 sent from network interface module 126, and to serve as an interface between NIM 126 and network communications processing module 104. For example, NIM module 126 may be any of a plurality of types of NIM and interface 106 may be configured to hide the details of the type of NIM from module 104 so that module 104 does not have to be configured to implement the details of each individual type of NIM. Although not illustrated, a plurality of NIMs 126 (e.g., NICs) may be resident on network device 101 and coupled to host 102. The NIM interface 106 may include one or more subcomponents (e.g., logical ports), each subcomponent corresponding to a particular one of the plurality of NIMs. For example, NIM interface 106 may be a Network Driver Interface Specification (NDIS) module configured in accordance with NDIS, and it may include an NDIS interface and a plurality of NDIS mini-ports, each mini-port associated with a particular NIM 126 connected to host 102.

The packet information 129 provided to NIM interface 106 may be provided in packet batches. As used herein, a "packet batch" or "batch" is a set of one or more packets grouped together by the network interface module. For each batch that it receives, the NIM interface 106 may be configured to provide the packets within the batch to the network communications processing module 104 individually, i.e., one at a time. The number of packets included in one batch (and indicated as such to interface 106) may be based on any of a variety of factors including the interrupt moderation scheme used by NIM 126 (i.e., how often NIM 126 interrupts the CPU with receive interrupts for incoming packets), the speed of the NIM 126 and the latency between the sending of the receive interrupt and the response from the host. In some embodiments, NIM 126 is configured to disable the sending of receive interrupts while the processing of a batch of received packets is in progress, and to re-enable the sending of the receive interrupts after all packets of the batch have been processed. As NIM 126 receives more packets 132 from the network, it may generate another interrupt. After a response is received, the NIM 126 (e.g., receive logic 128) may package as a batch any packets it has received since the last time it created and indicated a batch to host 102, and indicate the new batch of received packets to NIM interface 106. This cycle may continue as long as the NIM 126 receives more packets 132 from network 134. The processing of each batch of received packets by the host 102 is often referred to herein as a "receive cycle".

Network communications processing module 104 processes each packet received by the host. This processing may include a number of operations, including validating the packet, identifying a connection to which the packet belongs, finding an application buffer to which the packet payload should be copied, copying the packet through the application buffer, completing the I/O request by making an appropriate system call, acknowledging the received packet to the sender, other operations, or any suitable combination of the foregoing. In some embodiments, for example when TCP/IP processing is employed, processing module 104 is configured to complete a network I/O request for a packet only after the entire packet payload of the packet has been copied into the application buffer. Further, for efficiency purposes, some of these operations, such as completing I/O requests and sending acknowledgement (ACK) packets to the sender, may be deferred until the end of each receive cycle instead of performing as the individual packets are being processed.

In some embodiments, network communications processing module 104 may be configured to employ a CPU to copy the data payload of a packet from a network interface buffer 130 to an application buffer 114. In such embodiments, the copy is performed in essence "immediately", and the copying of the payload to the application buffer is complete by the time that the module 104 receives notification from the CPU (e.g., a return of the call made to the CPU). Obviously, while the CPU is doing the copying, it cannot be used for anything else. Accordingly, in some embodiments, it may be desirable to do a DMA copy rather than using the CPU, for example, by using DMA module 117 so the CPU is free to be used to perform other operations, for example, processing a next received packet.

Accordingly, in the some embodiments, to copy the payload of a packet to an application buffer 114, network communications processing module 104 sends a DMA request 110 to a DMA module 117. In some embodiments, module 117 includes a DMA interface 118 that receives the DMA request and handles all communications between the module 104 and a DMA engine 122 included within DMA module 117. The DMA engine 122 may be configured as the component that actually performs the copying of packet payloads 124 from network interface buffers 130 to application buffers 114 (e.g., as packet payloads 116). For example, in some embodiments in which an operating system available from Microsoft Corporation is employed (e.g., one of those operating systems listed below), DMA interface 118 may be a NetDMA application programming interface (API), and DMA engine 122 may be a DMA engine produced by Microsoft Corporation or another third party vendor. By including a DMA interface 118, the details of the DMA engine 122 (e.g., if the DMA engine is provided by a third party vendor) are hidden from network communications processing module 104. That is, module 104 does not have to be configured for all potential configurations of DMA engine 122, as these details are handled by DMA interface 118.

As used herein, an "application programming interface" or "API" is a set of one or more computer-readable instructions that provide access to one or more other sets of computer-readable instructions that define functions and/or data types, so that such functions and/or data types can be configured to be executed on a computer in conjunction with an application program. An API may be considered the "glue" between application programs and a particular computer environment or platform (e.g., any of those discussed herein) and may enable a programmer to program applications to run on one or more particular computer platforms or in one or more particular computer environments.

In response to a request 110, DMA engine 122 copies a packet payload to application buffer 114 for a packet, while the CPU 103 is free to perform other operations such as processing other packets. As opposed to when a payload is copied using the CPU, in which case the copy is completed relatively immediately, the copy will be completed sometime in the future when the DMA module 117 is used to copy the payload. Further, the processing of the packet, including notifying an application corresponding to the packet that the processing of the packet is complete (e.g., that the I/O request is complete), cannot be achieved until the copy is complete.

In some embodiments, to determine whether the copying of a packet payload is complete, the DMA module 117 may send an interrupt to CPU 103 when completed. However, as noted above, such interrupts are an expensive use of CPU time. In other embodiments, a polling method may be employed in which the network communications processing module 104 sends a completion poll 112 to DMA module 117. As used herein, a "poll" is an inquiry sent from one component to another, and "polling" is the sending of an inquiry from one component to another. Further, a "complete poll" is an inquiry regarding whether the DMA copy of a packet payload has been completed.

In some embodiments, the DMA module 117 includes a completion status register 120 in which the status of all DMA copies are stored. It should be appreciated that register 120 could be located elsewhere on host 102 outside of module 117. DMA engine 122 may be configured to update the status of a DMA copy for a packet in register 120 to "complete" in response to completing the copy of the packet payload. In response to receiving a completion poll, the DMA interface 118 or the DMA engine 122 may access the completion status register entry corresponding to the packet for which the poll was submitted, and determine whether the status is complete. The DMA interface 118 may send a poll response 108, in reply to the completion poll 112, to the network communications processing module 104. If the poll response 108 indicates that the processing is complete, module 104 may complete the I/O processing for the packet. As noted above, in some embodiments, the completion of I/O requests, including sending acknowledgements to the sender of the packet, are deferred until the end of a receive cycle.

While the DMA module 117 is being polled, the CPU cannot be used for anything else. Accordingly, it may be desirable to schedule the polling of the DMA module to occur when it is likely that the DMA copy is complete, so that the polling does not have to be repeated more than once. Further, because the CPU itself is not performing the copy, it cannot rely on determining the status of the copy by checking its internal cache. Accordingly, the CPU would have to incur a cache miss to determine the status, which makes polling for the completion of a DMA copy even more expensive, which, in turn, makes the timing of the polling more critical.

Accordingly, in some embodiments of the invention, a network communications processing module 104 polls the DMA module 117 during a next receive cycle (i.e., during the processing of a next batch) from the cycle in which the packet is processed. By delaying the polling of the DMA module 117 until a next cycle (and thus delaying the completion of an I/O request for an application), the likelihood is increased (in some cases significantly increased) that by the time the polling takes place, the copy operation is complete. As a result, the DMA module 117 may only be polled once, thereby using a minimal amount of CPU time in polling the DMA module.

As noted above, in some embodiments, an I/O request for a given packet cannot be completed until it has been positively verified that the DMA copy operation of the packet payload 116 of the packet into an associated application buffer 114 is complete. Thus, by deferring polling for the completion of the DMA copy until a next receive cycle (i.e., until a processing of a next batch), the completion of the I/O request for the packet is also deferred. It may be desirable to avoid delaying completion of an I/O request for too long.

Accordingly, in some embodiments, system 101 is configured to protect against cases in which a batch is not received by the host for too long a period of time. For example, system 100 may include a timer 105. Network communications processing module 104 may be configured to set a timeout value in timer 105 at the end of the each receive cycle. If the timeout value expires before module 104 receives a next batch from NIM 126, module 104 may send completion poll 112. That is, module 104 may send completion poll 112 before receipt and processing of a next batch. Processing module 104 may be configured to cancel timer 105 if a next batch is received before the timer elapses, and reset the timer once again at the completion of the processing of the next batch.

The timeout value stored in timer 105 may be selected to balance the competing interests of: allowing a reasonable amount of time for a next receive cycle to begin (i.e., for a next batch to be received); and preventing too long a lapse of time which would result in excessive delay for completion of an I/O request. For example, in some embodiments, the timeout value selected for the timer 104 is selected such that, on a relatively busy host, in most cases the host (for example, network communications processing module 104, e.g., a TCP/IP stack) of the host, receives one or more packets for processing before the timer expires. As a result, the expiration (i.e., firing or executing) of the timer is typically avoided for each receive cycle, avoiding the relatively expensive costs of executing the timer. Rather, the timer 105 is typically canceled and reset once per receive cycle, in response to a batch being received and then processed, respectively, during the receive cycle.

System 100, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one-or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 4 and 5.

Figure 2:
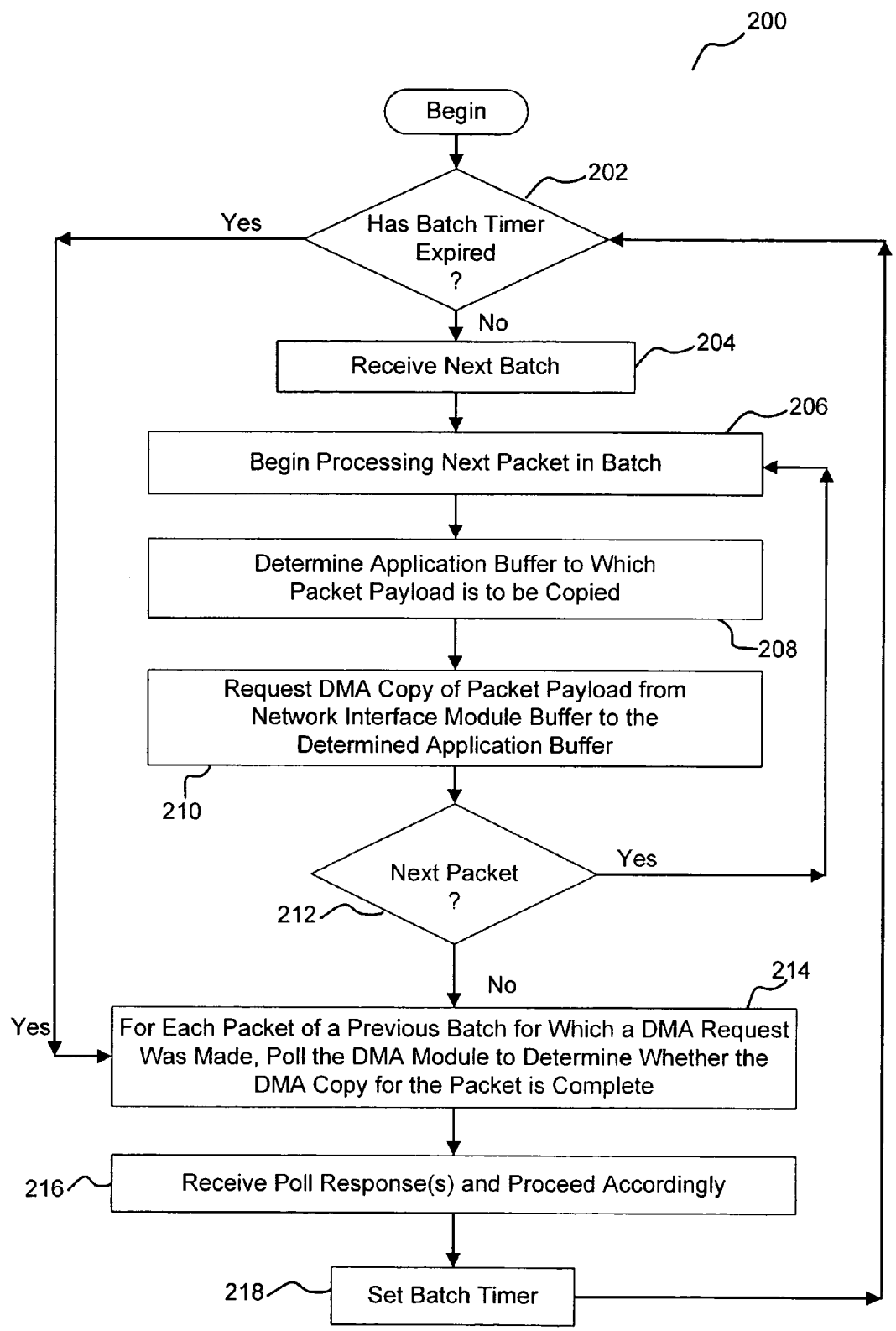
FIG. 2 is a flow chart illustrating an example of a method of efficiently polling a DMA module to determine completion of a DMA copy operation, according to some embodiments of the invention.

FIG. 2 is a flow chart illustrating an example of a method 200 of efficiently polling a DMA module to determine completion of a DMA copy operation, according to some embodiments of the invention. Method 200 is merely an illustrative embodiment of a method of efficiently polling a DMA module to determine completion of a DMA copy operation, and is not intended to limit the scope of the invention. Any of numerous other implementations of such a method, for example, variations of method 200, are possible and are intended to fall within the scope of the invention. In some embodiments, method 200 or one or more acts thereof is implemented in accordance with timing diagram 300 described below in relation to FIG. 3.

In Act 202 it may be determined whether a batch timer has expired (i.e., executed or fired). As noted above, at the completion of the processing of a batch, a batch timer is set, for example, in Act 218 below. If the timer has not expired, then method 200 proceeds to Act 204. It should be appreciated that Act 202, although illustrated as an act performed as part of a series of acts of method 200 is not limited to being an affirmative act performed in series as part of method 200. Rather, the expiration of a timer is asynchronous event that may occur at any time prior to Act 204 or may not occur at all.

In Act 204, a next batch is received, i.e., a next receive cycle is started as described above. In response to receipt of the batch, the timer may be reset. In Act 206, processing of the batch begins. The processing of a batch may include any of the operations described above, including determining an application buffer to which to copy the payload of the packet in Act 208.

In Act 210, a request may be made (e.g., from network communications processing module 104 to a DMA module 117) to perform a DMA copy of a payload of the packet from a network interface module buffer (e.g., buffer 130), to a determined application buffer (e.g., buffer 114), for example, as described above in relation to FIG. 1.

In Act 212, it may be determined whether there is a next packet in the batch, for example, as the DMA copy of the previous packet is being performed. For example, network communications processing module 104 may determine whether there are any packets remaining in the packets of the batch indicating to it by network interface module 127. If there are more packets, then method 200 proceeds to 206 and Acts 206-210 are performed for the packet. If there is not a next packet in the batch, then in Act 214, for each packet of a previous batch (e.g., an immediately preceding batch) for which a DMA request was made, the DMA module may be polled to determine whether the DMA copy for the packet is complete. For example, as described above in relation to FIG. 1, a completion poll 112 may be sent to DMA module 117 by module 104. DMA module 117, in particular DMA interface 118, may check the status of the DMA copy of the packet payload in completion status register 120. It should be appreciated that during the performance of Acts 212-216 for a previous batch, the DMA copying of the packet payloads of the present batch may be performed.

In Act 216, for each packet for which a poll was made to the DMA module, a poll response may be received and the packet processing may proceed accordingly. For example, DMA interface 118 may send a poll response 108 to network communications processing module 104. For each packet, if the poll response 108 indicates that the DMA copying is complete, then module. 104 may indicate to the application corresponding to the packet that the I/O request for the packet is complete, and also may initiate sending an acknowledgement to the sender. If the poll response 108 indicates that the DMA copy for a packet is not complete, network communications processing module 104 sends at least one more completion poll 112 to DMA module 117. The number, timing and frequency of the one or more additional completion polls 112 (i.e., in addition to the original completion poll) sent for a packet may vary.

In Act 218, a batch timer may be set. For example, referring to FIG. 1, timer 105 may be reset at the completion of the processing of each batch. Method 200 then may proceed to Act 202, in which, where it is determined whether the batch timer has expired before the reception of the next batch in Act 204. The performance of Acts 206-218 may be considered the duration of the processing of a batch and/or the receive cycle of a batch.

Although many of the acts of the method described above in relation to FIG. 2 and functions described in relation to FIG. 1 are described in relation to being performed by a host (e.g., host 102), for example, a network communications processing module (e.g., module 104) and DMA module (e.g., module 117) running on of the host, the invention is not so limited. One of more of these functions and/or acts may be performed by a NIM (e.g., NIM 126), for example, a NIC. For example, system 100 and method 200 may be configured to implement any of a variety of technologies in which one or more aspects of performing network communications processing (e.g., TCP/IP processing) is delegated to a NIM, such as, for example: "checksum task offload"; "TCP Chimney offload", "Remote DMA" (RDMA); other technologies; and any suitable combination of the foregoing.

Method 200 may include additional acts. Further, the order of the acts performed as part of method 200 is not limited to the order illustrated in FIG. 2, as the acts may be performed in other orders and/or one or more of the acts may be performed in series or in parallel, at least partially. For example, Acts 214 and 216 may be performed at any time after the performance of Act 204 during performance of method 200. Further, batch timer 218 may be set at another time during the processing of a batch.

Figure 3:
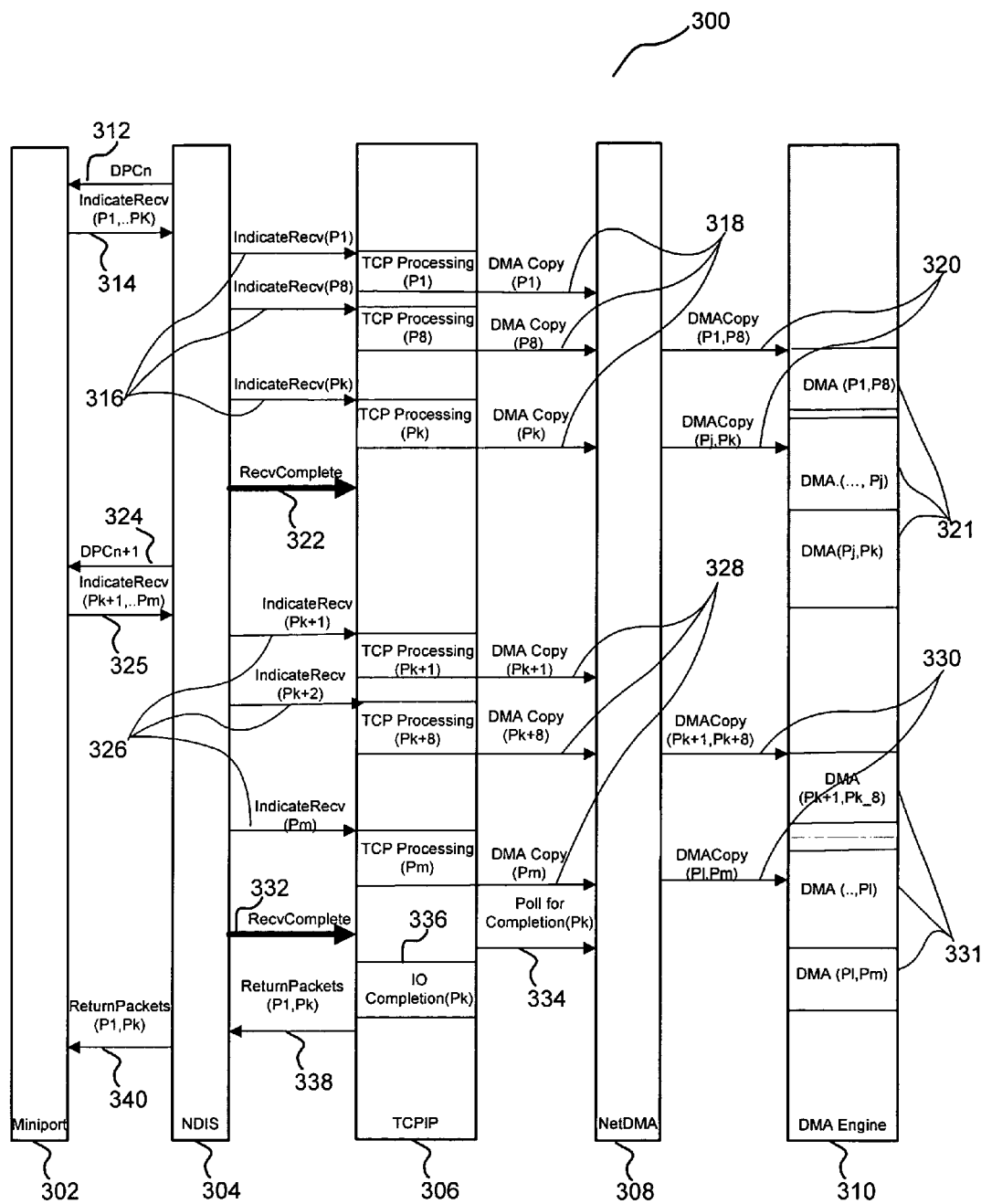
FIG. 3 is a timing diagram illustrating an example of a method of efficiently polling a DMA module to determine completion of a DMA operation, according to some embodiments of the invention.

FIG. 3 is a timing diagram 300 illustrating an example of a method of efficiently polling a DMA module to determine completion of a DMA operation, according to some embodiments of the invention. Timing diagram 300 illustrates an example of a method for efficiently polling a DMA module that may be implemented when an operating system available from Microsoft Corporation (e.g., one of the operating system listed below) is used. This method is merely an illustrative embodiment of a method of efficiently polling a DMA module to determine completion of a DMA copy operation, and is not intended to limit the scope of the invention. Any of numerous other implementations of such a method are possible, including variations of the method illustrated in timing diagram 300, and are intended to fall within the scope of the invention.

FIG. 3 illustrates five components, which may be part a system for efficiently polling a DMA module to determine completion of a DMA copy operation, and which may be used to implement elements of system 100 illustrated above in FIG. 1. These components may include a mini-port driver 302, an NDIS interface 304, a TCP/IP stack 306, a NetDMA interface 308 and a DMA engine 310. Mini-port driver 302 and NDIS interface 304 may be part of NIM interface 106, and TCP/IP stack 306 may be part of network communications processing module 104. NetDMA interface 308 may be part of DMA interface 148, and DMA engine 310 may be DMA engine 122.

NDIS interface 304 may send a deferred procedure call (DPC) to mini-port driver 302. DCP 312 may be sent in response to a receipt interrupt being sent from a network interface module (e.g., NIM 126), which may be a NIC. As noted above, in response to receiving one or more packets 132 from network 134, NIM 126 may send a receipt interrupt to host 102. The interrupt may cause a Interrupt Service Routine (ISR) call from the host to NDIS interface 304, and then from NDIS interface 304 to the mini-port driver 302 corresponding to NIM 126. Mini-port driver 302, after determining that the interrupt corresponds to NIM 126, may request a DPC from NDIS interface 304. This eventually results in DPC 312 being issued from NDIS interface 304 to mini-port driver 302. In essence, NDIS interface 304 may serve as "middleman" for all ISR and DPC calls between the host (including TCP/IP stack 306) and mini-port driver 302 for NIM 126.

In response to receiving DPC 312, mini-port driver 302 may indicate (314) a batch of packets P1-Pk to NDIS interface 304. This indication 314 may commence the receiving cycle (e.g., the processing) of a batch, for example, as part of Act 204 described above.

Although mini-port driver 302 may indicate the packets in the form of batches to NDIS interface 304, NDIS interface 304 may indicate (316) individual packets P1, P2 . . . Pk to TCP/IP stack 306, and as illustrated, TCP/IP stack 306 may process the packets individually. For each packet, after the application buffer for each packet has been determined (e.g., as part of Act 208), a DMA copy request may be sent to NetDMA interface 308. These requests 318 are received in sequence by NetDMA interface 308. NetDMA interface 308 then may convey these DMA requests to DMA engine 310. As illustrated in FIG. 3, NetDMA interface 308 may package two or more of the requests 318 into a single DMA request communicated to DMA engine 310 as part of requests 320. DMA engine 310 then performs the DMA copying of the packet payloads (321).

As illustrated in FIG. 3, NDIS interface 304 sends a notification (322) to TCP/IP stack 306 notifying it that the input of the current batch by NDIS interface 304 to TCP/IP stack 306 is complete. However, as illustrated in FIG. 3, the DMA copying of the packets of the batch continue after the indication 322 is made. Further, it should be noted that TCP/IP stack 306 does not poll DMA interface 308 at this time to determine whether any of the DMA copying 321 is complete.

The process illustrated by elements 312-322 for processing packets P1-Pk is repeated by elements 324-332 for processing packets Pk+1-Pm. However, after indication 332, TCP/IP stack 306 polls 334 NetDMA interface 308 for completion of the DMA copying of packets Pk+1-31 Pm. If NetDMA interface 308 indicates to TCP/IP 306 that the DMA copy of a packet payload is complete (not shown), then TCP/IP stack 306 may complete the I/O request corresponding to the packet (336). TCP/IP stack 306 then may communicate to NIM 126 that it is through processing the packets of the batch so the NIM 126 can now use network interface buffers 127 for other packets. This communication is illustrated in diagram 300 by the return packets communication 336 transmitted from TCP/IP stack 306 to NDIS interface 304, and return packets communication 340 sent from NDIS interface 304 to mini-port driver 302. In response to return packets communication 340, mini-port driver 302 may send a communication to NIM 126, so that NIM 126 can free-up buffers 130.

Method 200 and the method illustrated by timing diagram 300, and acts thereof, and various embodiments and variations of these methods and these acts, individually or in combination, may be defined by computer-readable instructions tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Computer-readable instructions embodied on one or more computer-readable media may define instructions, for example, as part of one or more programs that, as a result of being executed by a computer, instruct the computer to perform one or more of the functions described herein (e.g., method 200 and the method illustrate in timing diagram 300 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 400 and 500 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 4:
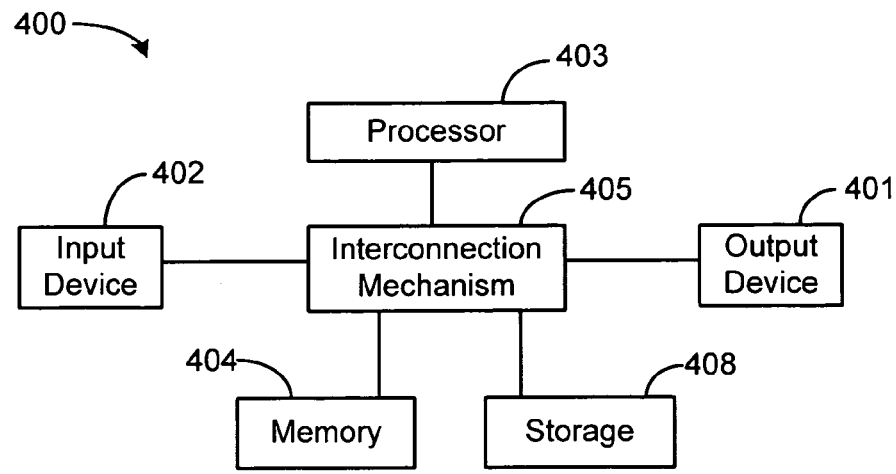
FIG. 4 is a block diagram illustrating an example of a computer system on which some embodiments of the invention may be implemented.
Figure 5:
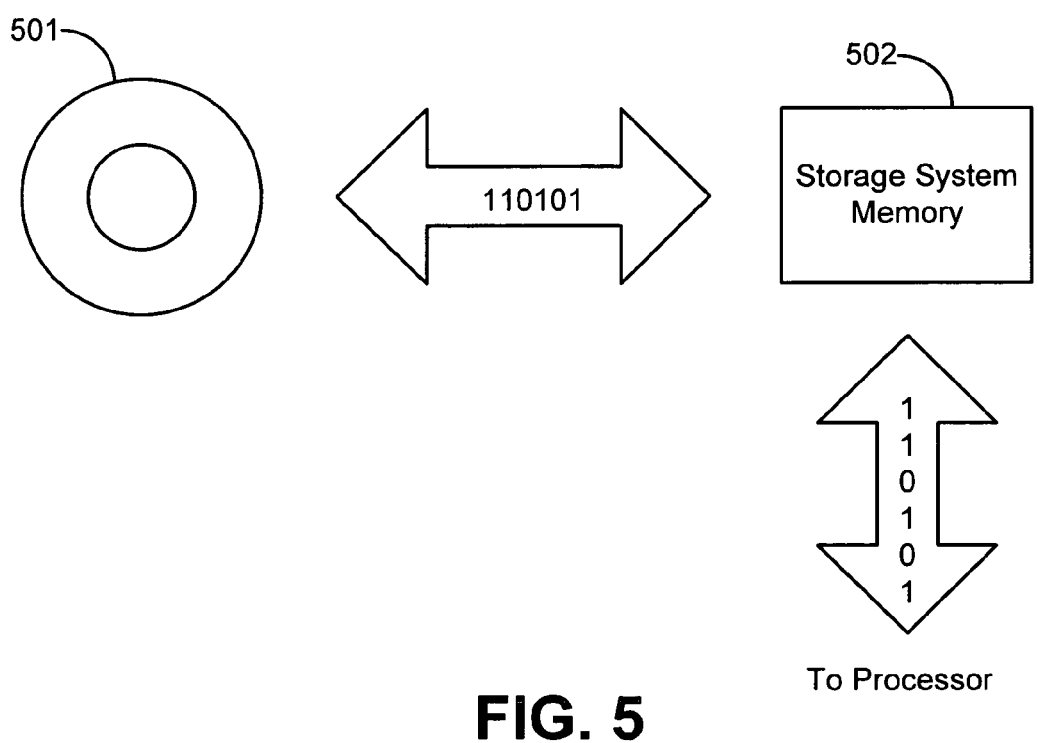
FIG. 5 is a block diagram illustrating an example of a storage system that may be used as part of the computer system to implement some embodiments of the invention.

It should be appreciated that any single component or collection of multiple components of a computer system, for example, any of the computer systems described in relation to FIGS. 1, 4 and 5, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405).

The storage system 506, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 also may be implemented using specially-programmed, special-purpose hardware. In computer system 400, processor 403 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network.

Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative-and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of processing a packet of information received at a network device from a communications network, the packet belonging to a packet batch defined by a network interface module of the network device, the method comprising:
 (A) during processing of a first packet batch, sending, by a network communications processing module, a request to a direct memory access module to copy a payload of a packet of the first packet batch from a buffer of the network interface module to an application buffer on the network device;
 (B) completing the processing of the first packet batch by the network communications processing module; and
 (C) deferring polling of the direct memory access module until after the network communications processing module has requested copying, to a determined application buffer, of all packets of a next packet batch following the first packet batch and then polling, by the network communications processing module, the direct memory access module to determine whether the direct memory access module has completed copying of the packet of the first packet batch to the application buffer, except that if a predefined amount of time has elapsed after the completion of the processing of the first packet batch and before reception of a next packet batch, polling the direct memory access module prior to receiving a next packet batch to determine whether the direct memory access module has completed copying the packet of the first packet batch to the application buffer.

2. The method of claim 1, further comprising:
 (D) during processing of the first packet batch, determining the application buffer to which to copy the payload of the packet, wherein the act (A) is performed in response to the act (D).

3. The method of claim 1, further comprising:
 (D) the direct memory access module accessing a completion status register in response to the act (C) to determine whether the direct memory access module has completed copying the packet to the application buffer.

4. The method of claim 1, further comprising:
 (D) receiving a response to the polling from the direct memory access module, the response indicating whether the copying of the packet is complete; and
 (E) if the copy is complete, informing an application corresponding to the packet that the copy is complete.

5. A computer-readable storage device encoded with computer-executable instructions that, as a result of being executed by a computer, control the computer to perform a method of processing a packet of information received at a network device from a communications network, the packet belonging to a packet batch defined by a network interface module of the network device, the method comprising:
 (A) during processing of a first packet batch by the computer, sending, by a network communications processing module, a request to a direct memory access module to copy a payload of a packet of the first packet batch from a buffer of the network interface module to an application buffer on the network device and deferring polling of the direct memory access module until after the network communications processing module has requested copying, to a determined application buffer, of all packets of a next packet batch following the first packet batch; and (B) then polling, by the network communications processing module, the direct memory access module to determine whether the direct memory access module has completed copying of the packet of the first packet batch to the application buffer, except that if a predefined amount of time has elapsed after the completion of the processing of the first packet batch and before reception of a second packet batch, polling the direct memory access module prior to receiving a second packet batch to determine whether the direct memory access module has completed copying the packet of the first packet batch to the application buffer.

6. The computer-readable storage device of claim 5, wherein the method further comprises:
(C) prior to performance of the act (A), receiving the first packet batch from the network interface module; and
(D) prior to performance of the act (B), receiving the second packet batch as the next packet batch received from the network interface following the reception of the first packet batch.

7. The computer-readable storage device of claim 5, wherein the method further comprises:
(C) completing the processing of the first packet batch, including setting a timer with a value indicative of a period of time following the completion of the processing of the first packet batch after which the direct memory access module is to be polled regardless of whether a next packet batch has been received;
(D) receiving the second packet batch as the next packet batch prior to expiration of the period.

8. The computer-readable storage device of claim 5, wherein the method further comprises:
(C) accessing a completion status register in response to the act (B) to determine whether the direct memory access module has completed copying the packet to the application buffer.

9. The computer-readable storage device of claim 5, wherein the method further comprises:
(C) receiving a response to the polling from the direct memory access module, the response indicating whether the copying of the packet is complete; and
(D) if the copy is complete, informing an application corresponding to the packet that the copy is complete.

10. A system for processing a packet of information received at a network device from a communications network, the packet belonging to a packet batch defined by a network interface module of the network device, the system comprising:
a processor and a memory, the memory containing:
a direct memory access module operative to copy information to application buffers on the network device without use of a central processing unit of the network device; and
a network communications processing module operative to send a request to the direct memory access module, during processing of a first packet batch, for the direct memory access module to copy a payload of the packet of the first packet batch from a buffer of the network interface module to an application buffer on the network device, and to defer polling of the direct memory access module until after the network communications processing module has requested copying, to a determined application buffer, of all packets of a next packet batch following the first packet batch and then polling the direct memory access module to determine whether the direct memory access module has completed copying of the packet of the first packet batch to the application buffer, except that if a predefined amount of time has elapsed after the completion of the processing of the first packet batch and before reception of a next packet batch, to poll the direct memory access module prior to receiving a next packet batch to determine whether the direct memory access module has completed copying the packet of the first packet batch to the application buffer.

11. The system of claim 10, further comprising:
a timer holding a timer value,
wherein the network communications processing module is operative to set the timer with the timer value at the completion of the processing of the first batch and to poll the direct memory access module in response to an expiration of the timer.

12. The system of claim 10, wherein the direct memory access module is operative to access a completion status register, in response to receiving the poll, to determine whether the direct memory access module has completed copying the packet to the application buffer.

13. The system of claim 10, wherein the direct memory access module is operative to receive a response to the poll, the response indicating whether the copying of the packet is complete, and, if the copy is complete, to inform an application corresponding to the packet that the copy is complete.

14. The system of claim 10, wherein the network communications processing module is part of an operating system running on the network device.

15. The system of claim 14, wherein at least a portion of the direct memory access module is a part of the operating system.

16. The system of claim 10, wherein the network communications processing module comprises at least a portion of a TCP/IP stack.

17. The system of claim 10, wherein the direct memory access module comprises:
a direct memory access engine operative to perform the copying of information to application buffers, and
an interface to handle communications between the direct memory access engine and the network communications processing module.

18. The system of claim 10, further comprising:
an interface to handle communications between the network communications processing module and the network interface module.

\* \* \* \* \*